(12) United States Patent
McGrath

(10) Patent No.: US 11,048,592 B2
(45) Date of Patent: *Jun. 29, 2021

(54) DATA REPOSITORY CONFIGURED FOR FACILITATING POINT-IN-TIME RETRIEVAL OF CONTENT

(71) Applicant: Propylon Limited, Dublin (IE)

(72) Inventor: Sean McGrath, Lawrence, KS (US)

(73) Assignee: PROPYLON LIMITED, Dublin (IE)

(*) Notice: Subject to any disclaimer, the term of this patent is extended or adjusted under 35 U.S.C. 154(b) by 704 days.

This patent is subject to a terminal disclaimer.

(21) Appl. No.: 15/468,319

(22) Filed: Mar. 24, 2017

(65) Prior Publication Data

US 2017/0255524 A1 Sep. 7, 2017

Related U.S. Application Data

(63) Continuation-in-part of application No. 13/956,253, filed on Jul. 31, 2013, now Pat. No. 9,690,795.

(60) Provisional application No. 61/681,224, filed on Aug. 9, 2012.

(51) Int. Cl.
*G06F 16/30* (2019.01)
*G06F 11/14* (2006.01)
*G06F 16/93* (2019.01)
*G06F 16/955* (2019.01)

(52) U.S. Cl.
CPC ......... *G06F 11/1451* (2013.01); *G06F 16/93* (2019.01); *G06F 16/9566* (2019.01); *G06F 2201/84* (2013.01)

(58) Field of Classification Search
CPC ............................. G06F 2201/84; G06F 16/94
See application file for complete search history.

(56) References Cited

U.S. PATENT DOCUMENTS

| 8,868,506 | B1 | 10/2014 | Bhargava |
| 2002/0169658 | A1 | 11/2002 | Adler |
| 2004/0139116 | A1 | 7/2004 | Porter |
| 2006/0218305 | A1 | 9/2006 | Kinnan |
| 2007/0136394 | A1* | 6/2007 | Cowan ............... G06F 40/197 |
| 2007/0143363 | A1 | 6/2007 | Agarwal et al. |
| 2008/0104140 | A1 | 5/2008 | Vierich |
| 2009/0083268 | A1 | 3/2009 | Coqueret et al. |
| 2012/0254687 | A1 | 10/2012 | Leggette |

OTHER PUBLICATIONS

Propylon; Legislative Workbench (LWB); Technical White Paper; Version 1.0; 2012.

(Continued)

*Primary Examiner* — Mahesh H Dwivedi
(74) *Attorney, Agent, or Firm* — Martensen IP

(57) ABSTRACT

A data repository configured for storing original content and modified content which are addressable for point-in-time retrieval thereof. The data repository comprising one or more digital files which are associated with the original content. A log is provided which records actions implemented on the one or more of the digital files. A versioned repository is generated after an action is implemented on the one or more digital files. The versioned repository comprising one or more modified digital files which are associated with the modified content. A version identifier is associated with the versioned repository for facilitating point-in-time retrieval thereof.

29 Claims, 14 Drawing Sheets

(56) References Cited

OTHER PUBLICATIONS

Propylon; Legal and Regulatory Management Sytem datasheet; Jul. 27, 2010.
Propylon; Legislative Workbench; Screenshot dated Sep. 25, 2012.
Propylon; Legal & Regulatory Management System; Jul. 20, 2011; pp. 1-3 https://web.archive.org/web/20110720144338/http://www.propylon.com/index.php/technology/lrms.
Propylon; TimeArc; Jul. 20, 2011; pp. 1-2 https://web.archive.org/web/20110720144052/http://www.propylon.com/index.php/technology/timearc.

* cited by examiner

DATA REPOSITORY CONFIGURED FOR FACILITATING POINT-IN-TIME RETRIEVAL OF CONTENT

RELATED APPLICATION

The present application is a continuation in part and relates to and claims the benefit of priority to U.S. Non-Provisional patent application Ser. No. 13/956,253 filed 31 Jul. 2013, which claims priority to U.S. Provisional Patent Application No. 61/681,224 filed 9 Aug. 2012 which are hereby incorporated by reference in their entirety for all purposes as if fully set forth herein.

FIELD OF THE INVENTION

This invention relates generally to a data repository configured for facilitating point in-time retrieval of content. More particularly, the present teaching relates to a data repository configured for storing original content and modified content which are addressable for point-in-time retrieval thereof.

BACKGROUND

An ever-increasing amount of digital content is created and consumed entirely electronically without ever existing in a traditional paper form. The cost savings that come from digital documents are very significant but there are drawbacks with paperless systems. In particular, there are issues with evaluating historical documents in a manner which replicates how those documents were collated or interacted at any one point-in-time.

For hypermedia content repositories, it is not feasible to load complete copies of the queried artifacts into the result set, as it may contain combinations of videos, documents, tabular data, spreadsheets, images etc. Moreover, because of the hyperlinking nature of hypermedia in which one digital artifact may contain references to numerous other digital artifacts in the same corpus, the queried artifacts may themselves, in turn, contain hypermedia links, which could result in the need to further access the repository to fully resolve all aspects of the result set.

Because of the complexity of the data types, it is common to use repository "pointers" in the result sets of queries made against hypermedia content repositories. In other words, the result set does not contain copies of the artifacts from the repository. Instead, the result set contains artifact pointers that can be subsequently used to retrieve the artifacts from the repository.

This use of artifact pointers in result sets creates a data consistency problem when the repository is updated (i.e. in the case of a dynamic repository). Specifically, the pointers in a result set that were valid before a repository update has happened, may become incorrect after the update has happened.

Two correctness situations arise:
  Firstly, an old pointer in a result set may no longer work if the pointed-to artifact has been deleted by an update that has happened since the result set was created.
  Secondly an old pointer may continue to work, but may return the incorrect version of the pointed-to artifact. I.e. the pointer references a digital artifact as it appears now, as opposed to how it appeared when the result set was originally created.

It is known to address this result set consistency problem via locking approaches and mutual exclusion zones. Both of these approaches suffer from the significant drawbacks that (a) all use of the result set must occur inside the lock-zone and (b) all updates to the repository are disabled when the system is in a locked state. In other words, no applications that need to make changes to the repository can be allowed to proceed until the lock is released.

It is also known to address the result set consistency problem via the creation of snapshot replicas. I.e. creation of complete replicas of all objects referenced in a result set for every query performed. This approach suffers from a replica explosion problem. i.e. for every result set, it is necessary to have a snapshot that contains complete copies of all the artifacts referenced in the result set.

SUMMARY OF THE INVENTION

These and other problems are addressed by the provision of a data repository configured for storing original content and modified content which are addressable for point-in-time retrieval thereof.

Accordingly, a first embodiment of the invention provides a data repository as detailed in claim 1. The teaching also provides an article of manufacture as detailed in claim 21. Furthermore, the teaching relates to a method as detailed in claim 22. Advantageous embodiments are provided in the dependent claims.

These and other features will be better understood with reference to the followings Figures which are provided to assist in an understanding of the teaching of the invention.

BRIEF DESCRIPTION OF THE DRAWINGS

The present invention will now be described with reference to the accompanying drawings in which:

FIG. 9 is a detail of the data repository of FIG. 5.
FIG. 11 is a detail of the data repository of FIG. 5.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Figure 1:
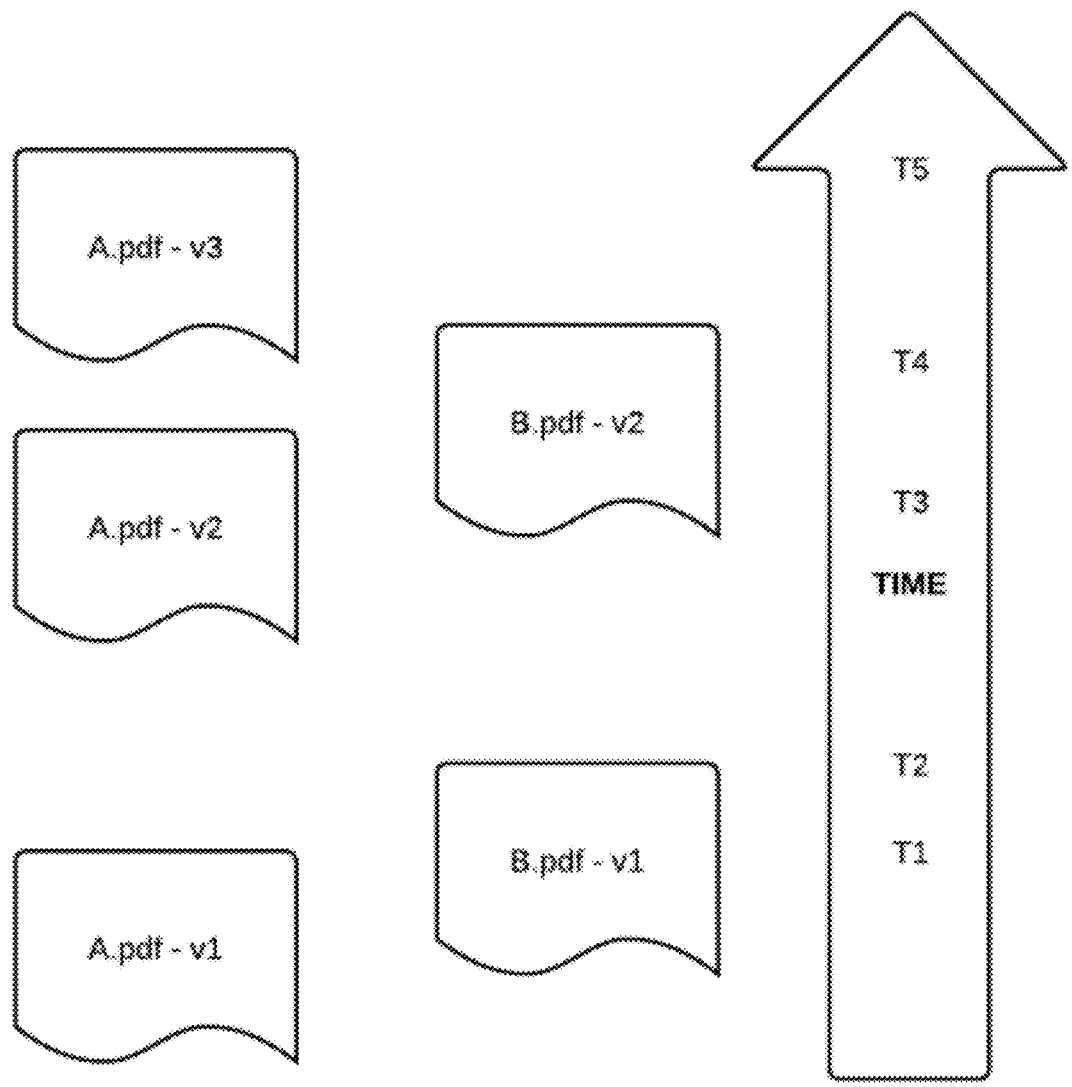
FIG. 1 is a block diagram illustrating a prior art arrangement for managing interrelated digital files.
Figure 2:
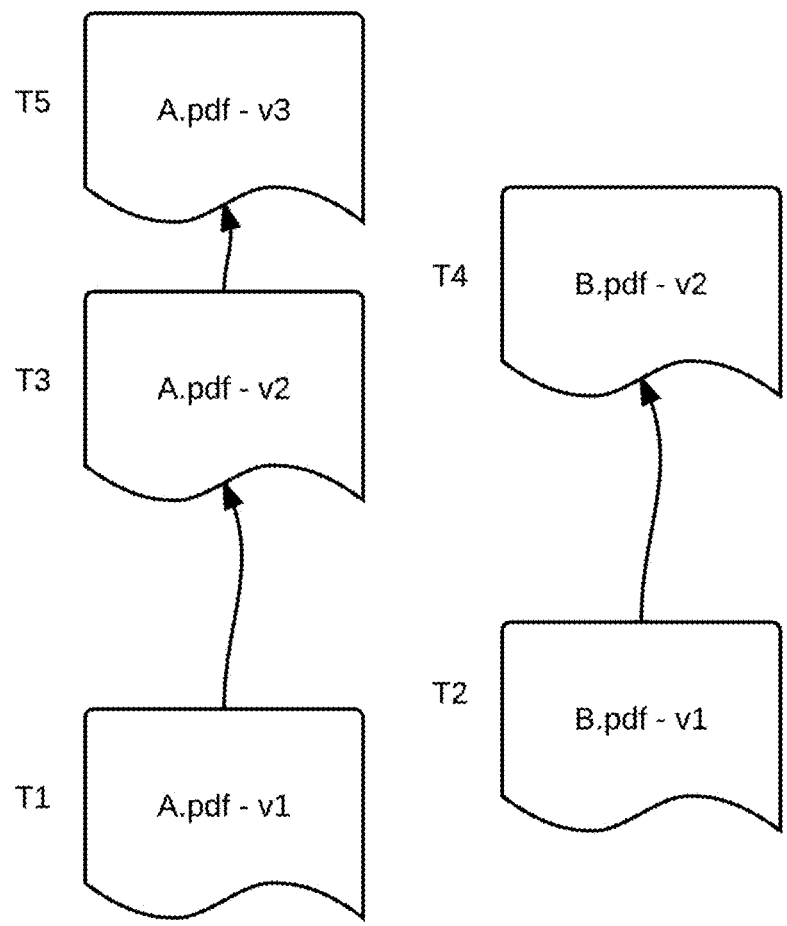
FIG. 2 is a block diagram illustrating a prior art arrangement for managing interrelated digital files.

Today, the standard design for a so called Document Management System (DMS) or Content Management System (CMS) or Record Management System (RMS) treats each digital file as a separate object with its own separate life history as illustrated in FIG. 1. In the example of FIG. 1, there are two digital files in the system, namely, A.pdf and B.pdf. File A.pdf has been versioned three times and file B.pdf has been versioned twice. The system manages the versioning automatically i.e. as files are saved, a new version number is assigned which are indicated by references v1-v3. Previous versions of each file are then available if needed. Each digital file has its own separate version history, independent of any other record as illustrated in FIG. 2.

User Interfaces and application programming interfaces associated with this sort of system will typically have function calls such as:
Retrieve latest version of A.pdf
Retrieve previous version of B.pdf
Retrieve version history of A.pdf As can be seen by the document-by-document nature of the functionality, these sort of systems treat a corpus of content as being simply a collection of independent digital files that each have their own separate life cycles. There are no corpus oriented management operations apart from creating archive bundles, classifying assets into folders etc.

Figure 3:
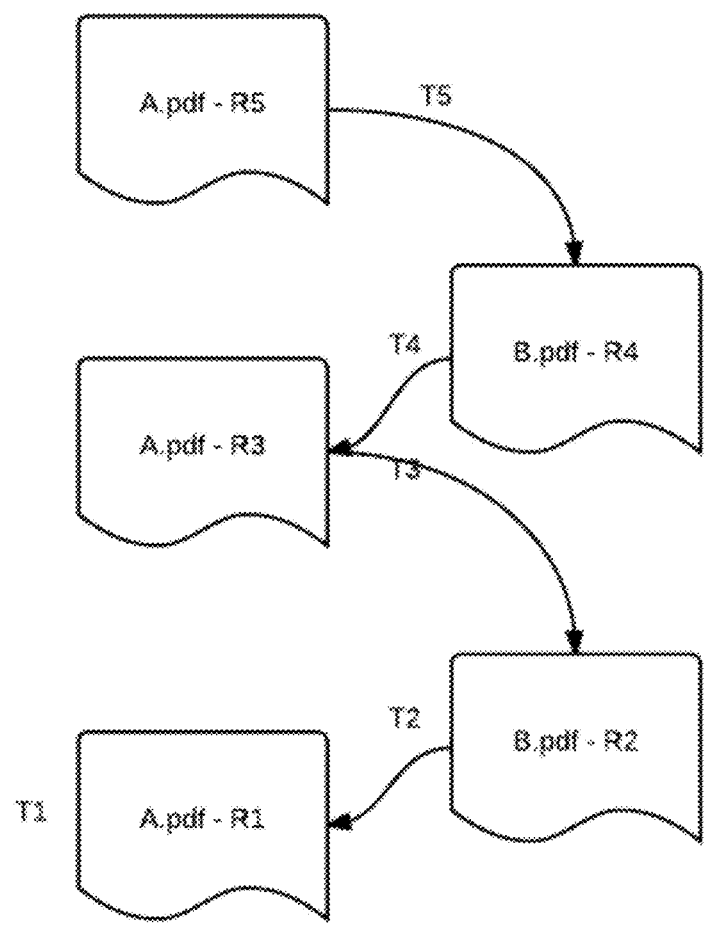
FIG. 3 is a block diagram illustrating a method for managing interrelated digital files in accordance with the present teaching.

The present teaching as illustrated in FIG. 3 provides a corpus centric approach rather than a document centric approach. In other words, the corpus (data repository) as a whole is versioned, rather than individual files. Rather than allocate version numbers to discrete digital assets such as documents, in a corpus-oriented approach, revision numbers are allocated to each change to the corpus. The example of FIG. 3 illustrates the following series of actions:
A.pdf initially created—Revision 1 at time T1
B.pdf initially created—Revision 2 at time T2
A.pdf updated—Revision 3 at time T3
B.pdf updated—Revision 4 at time T4
A.pdf updated—Revision 5 at time T5

A corpus based approach enables the management of corpus-wide provenance data. i.e. rather than be constrained to view the history of each digital file as a separate time-line. The present teaching archives the history of the entire corpus in the digital record and maps how it has evolved over time as illustrated in table 1:

TABLE 1

| Time | Event | Corpus Revision | User |
| --- | --- | --- | --- |
| T1 | A.pdf created | 1 | Joe |
| T2 | B.pdf created | 2 | Pat |
| T3 | A.pdf updated | 3 | Joe |
| T4 | B.pdf updated | 4 | John |
| T5 | A.pdf updated | 5 | Joe |

Each change to a corpus (sometimes referred to as a "patch" or a "delta") can consist of changes to one or more digital files. To keep disk space usage down to manageable levels, the patches/deltas typically consist of machine readable instructions to be followed in order to mutate the corpus from a given start revision number to the next revision number.

In the exemplary arrangement the digital record may be harvested and bundled together to form a single digital entity. A common way to do this is for a build manager to select a corpus revision number and snapshot the contents of the corpus at the desired revision number. In the current example, the digital data files that would be extracted and included in the digital data record are as illustrated in table 2:

TABLE 2

| Corpus extract revision number | Contents of extract |
| --- | --- |
| R1 | A.pdf, as it was at time T1 |
| | No B.pdf present |
| R2 | A.pdf, as it was at time T1 |
| | B.pdf, as it was at time T2 |
| R3 | A.pdf, as it was at time T3 |
| | B.pdf, as it was at time T2 |
| R4 | A.pdf, as it was at time T3 |
| | B.pdf, as it was at time T4 |
| R5 | A.pdf, as it was at time T5 |
| | B.pdf, as it was at time T4 |

The provenance information available here is clearly richer than it is in the classic document-by-document versioning approach of CMS/DMS/RMS systems. Examining the provenance reports provides insight into the exact state of all digital data files in the repository at the time a "build" was made i.e. a particular corpus revision number.

The corpus management approach has advantages over the document-by-document approach from a provenance perspective as it provides a history of the discrete digital files and their interrelationships. The benefits are particularly relevant when dealing with corpora that feature many thousands of closely inter-related digital files such as documents, databases and multimedia artifacts.

The richer provenance reporting possible with a corpus-based versioning approach, effectively creates an audit-trail analogous to the audit trail concepts in an accounting system. A provenance report for a digital asset in a corpus-based system can be seen as a ledger of transactions that together account for the state of the digital record.

The present method improves on the provenance capabilities of both the standard Document Management system approach and the standard source code management approach. It is complimentary to the use of tamper evidence methods such as MACs and Digital Signatures but rather than hash or sign a final document, the entire provenance can be made part of the tamper evidence protections. This corpus-based provenance model provides the inter-file reference consistency necessary to properly manage how files were collated or interacted at any one point-in-time.

Figure 4:
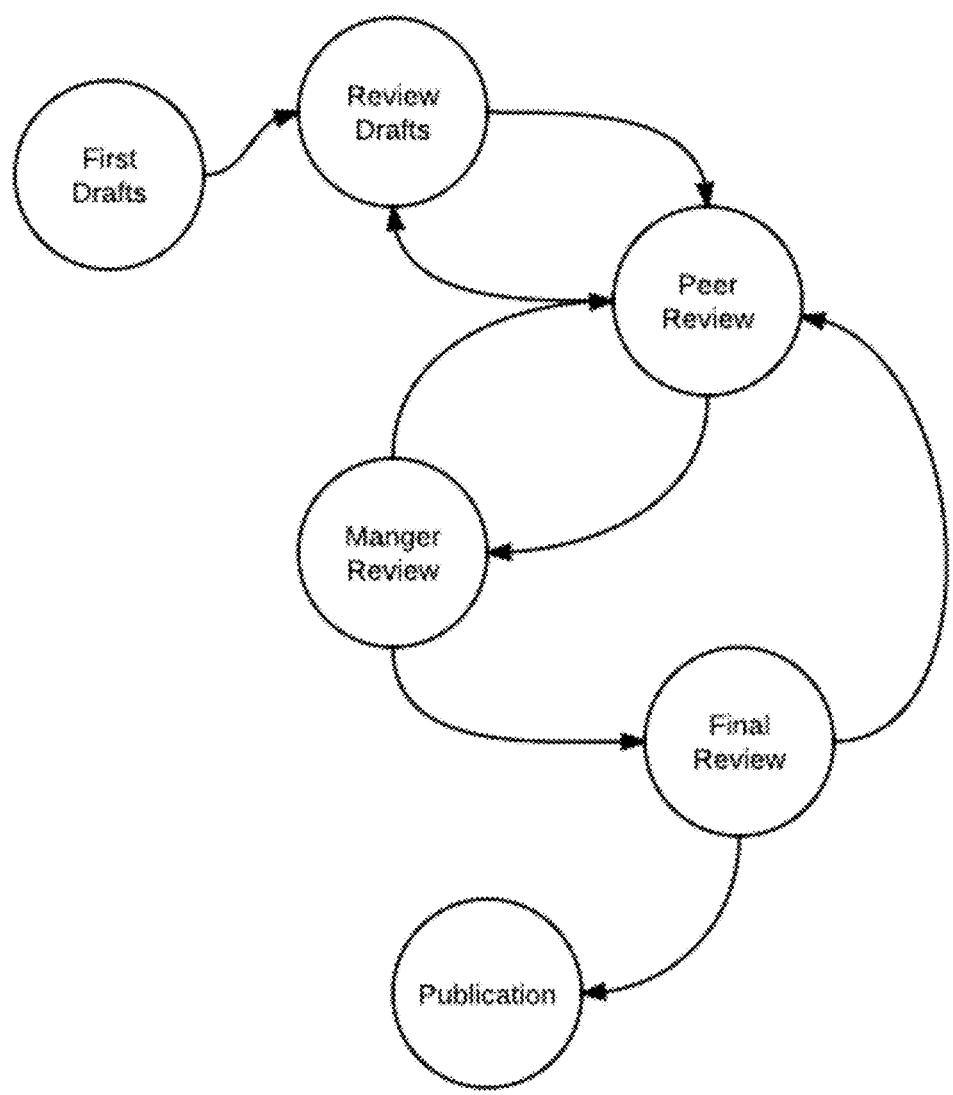
FIG. 4 is a work flow illustrating the steps for creating a data repository in accordance with the present teaching.

In business and legal applications, it is rare for a digital asset to simply be created and published in a single step. Oftentimes, there are elaborate workflows featuring multiple steps and people involved as illustrated in FIG. 4. In the present teaching workflow stages are reified into folder structures in the corpus management system itself. Additionally, workflow state transitions are included. Consider the following simple workflow history. The following workflow steps are provided as illustrated in Table 3:

TABLE 3

| Time | Action |
| --- | --- |
| T1 | B.doc created as a first draft |
| T2 | B.pdf packaged with B.doc and sent for review |
| T3 | Edits made to B.doc by review team. New B.pdf generated and sent to manager review |
| T4 | Edits made to B.doc by manager. New B.pdf generated and sent to final review |
| T5 | B unchanged by final review. B.pdf published. |

The history recorded in these various workflow actions add significantly to the completeness of the provenance picture for the final digital record B.pdf. To record these steps, the concept of a corpus-based approach is extended to include workflow folders and workflow state transitions as follows:
1. Create folders for first_drafts, review_drafts, peer_review, manager_review, final_review and publication.
2. Record all folder actions (creation, deletion, movement, renaming) as part of the revision history.
3. Include all folder information and revision history in the digital record.

An exemplary provenance report of the present teaching is illustrated in table 4:

TABLE 4

| Time | Event | Revision | User |
| --- | --- | --- | --- |
| T1 | /first_draft/b.doc created | 1 | Joe |
| T2 | /first_draft/b.pdf created | 2 | Pat |
| T3 | Copy /first_draft/b.doc to /review_drafts | 3 | Joe |
| T4 | Copy /first_draft/b.pdf to /review_drafts | 4 | Joe |
| T5 | Update /review_drafts/b.doc | 5 | Jane |
| ... | ... | ... | ... |
| T<N> | Copy /final_review/b.pdf /publish | <M> | Joe |

The system stores a complete history of each discrete revision of the repository such that it is easy to determine what every single asset in the repository looked like, at any chosen time point. Furthermore, a complete history of the workflow activity that resulted in each asset in the repository is stored. A complete history of how each asset in the repository has changed over time is also stored. The history data is then included in the final digital record.

A further aspect of the present method adds biographic data of people or entities that contribute to workflows. Examples of personnel and entities may include:
1. authors
2. editors
3. reviewers
4. committees
5. legislative chambers
6. commissions
7. rapporteurs By recording the personnel and entities as digital assets that have their own workflows in the corpus management system, they too become part of the provenance reporting. Adding personnel and entities involves creating folders and digital assets to hold the entities/personnel and their associated metadata. For example, the following may be provided in the present system:
A folder for personnel
Store phone number and employee number with each editor
Store the room number and meeting times for a committee
This allows the provenance reports to contain entries as illustrated in table 5:

TABLE 5

| Time | Event | Revision |
| --- | --- | --- |
| Ta | /committees/finance.odt created | Rn |
| Tb | Update to /committees/finance.odt created | Rm |
| Tc | Move /committees/finance.odt to /committees/tax_review.odt created | Rp |
| Td | Delete /committees/tax_review.odt | Rq |

For example, consider a scenario where one wishes to understand the history relating to a publication produced by a finance committee. From the above provenance report snippet one can see:
That the finance committee was formed at time Ta revision Rn
That the committee was updated at time Tb revision Rm
That the committee was renamed the tax review committee time Tc revision Rp
That the committee was removed at time Td revision Rq
If further information about the history of the committee is required, the contents of the assets involved in revision Rn to Rq can be examined. The contents will typically be metadata items such as committee membership, contact information for people, location information for meetings etc. Having this information in the system answers to questions such as:
Who was on the finance committee the day that xyz.doc passed final review?
What was the official meeting of the tax committee during January of 2010?

Another aspect of the present method is concerned with time aware citations between the various types of digital assets in the corpus management systems:
content documents referencing content documents
content documents referencing actors/entities
personnel/entities referencing content documents
personnel/entities referencing actors/entities Corpus revision numbers provide an efficient mechanism for citing an entire snapshot of the system. By using revision numbers it is possible to effectively lock down the entire state of the system as it was at a particular revision. However, in order to be of practical use, it is necessary to bind the concept of revision history into a referencing/citation infrastructure so that references to revisions and to specific assets and states at particular revisions can be expressed syntactically and used to retrieve information from the system. The present method achieves this by adding revision referencing into the Web URI space for the corpus management system. Simply put, if an asset is named /a/b/d.pdf in the system, then it may be cited as
http://www.example.com/a/b/d.pdf and retrieved over HTTP(s). The asset as it was at any historical time point, corresponding to a revision number, can be cited and retrieved by adding a revision number indicator such as:
http://www.example.com/a/b/d.pdf/rev/400. A URI without a revision number indicator refers to the asset as it appears at the point the URI is dereferenced. That is, multiple retrievals of the same asset can return different results if the underlying asset changes. Contrast this with URIs that have revision numbers. They are purely idempotent and will always return the same resource. The non-idempotent reference form can also be explicitly made like this for example:
http://www.example.com/a/b/d.pdf/rev/-1. Where -1 in the present method means "latest version". The present method of revision based referencing also applies to workflow states. For example, http://www.example.com/first_draft/rev/100 cites all assets that were in the workflow state known as "first_draft" as of revision 100.

This ability to cite digital files in a way that locks down the point-in-time used is what allows the relationships between documents, personnel and entities to be efficiently expressed and made reliable, even if the digital assets used to express the relationships change over time. Moreover, basing the citation on a URI scheme allows compliant systems to be navigated via a standard web browser using hyperlinks.

Finally, by manipulating a viewer's concept of "current revision number", it is possible to create a navigation experience for users that allows seamless traversal of hyperlinks whilst keeping the point-in-time fixed. i.e. having accessed digital file X as it was at revision R, any hyperlinks contained within X can be traversed as if they were citing digital assets at revision R. The net result of this is that the user finds themselves placed at a point-in-time and then navigating between digital files, seeing what they looked like at that point-in-time.

Another aspect of the present method is concerned with allowing workflow and status reporting to happen simultaneously with update activities without requiring locks, or semaphors or mutual exclusion zones. To see how this operates and the advantages it brings, consider a reporting module that needs to return a table of all assets in the "first_draft" workflow state. For example a sequence of events as is illustrated in table 6.

TABLE 6

| Time | Event | Revision |
|---|---|---|
| T1 | Folder /first_draft created | R1 |
| T2 | /first_draft/a.pdf created | R2 |
| T3 | /first_draft/b.pdf created | R3 |
| T4 | /first_draft/c.pdf created | R4 |
| T5 | /first_draft/b.pdf deleted | R5 |
| T6 | /first_draft/a.pdf updated | R6 |

In pseudo-code, the general form of the reporting algorithm is this:

```
Note the current date/time and create a header for the report with it
i.e. "Report as of DDMMYY HH:MM"
Get a list of all assets in first_draft/ folder (QUERY 1)
For each asset found:
    Get the asset: (QUERY 2)
    Add line to report about the asset
Print summary line to the report
```

For illustrative purposes, imagine a scenario where T1, T2 ... T6 are 1 second apart and it takes 1 second to run each query.
If QUERY 1 happens between T1 and T2, no assets are returned.
If QUERY 1 happens between T2 and T3, 1 asset is returned (a.pdf).
If QUERY 1 happens between T3 and T4, 2 asset is returned (a.pdf, b.pdf).
If QUERY 1 happens between T4 and T5, 3 asset are returned (a.pdf, b.pdf, c.pdf).

Note that if QUERY 1 happens between T4 and T5 and 3 assets is returned (a.pdf, b.pdf, c.pdf), the asset b.pdf will not be in the repository by the time QUERY 2 happens some seconds later. The standard approach to dealing with this problem in Computer Science is called locking. Simply put, updates to the system are put on hold so as to ensure that the report processing cannot be effected by update activity. In pseudo-code form:

```
Lock first_draft folder
Note the current date/time and create a header for the report with it
i.e. "Report as of DDMMYY HH:MM"
    Get a list of all assets in first_draft/ folder (QUERY 1)
    For each asset found:
        Get the asset : (QUERY 2)
        Add line to report about the asset
    Unlock the first_draft/ folder
    Print summary line to the report
```

The problems with locking are many and are well known. They cause blocking. i.e. some threads/processes have to wait for locks to be released. Furthermore, they add overhead for each access to a resource. Additionally, they can be vulnerable to failures and faults that are often very subtle and may be difficult to reproduce reliably. They are prone to deadlock situations e.g. where process A has lock 1 and is waiting to acquire lock 2. But process B has lock 2 and is waiting to acquire lock 1.

Locking is particularly problematic in a distributed system where unavoidable latencies and communications failures dramatically increase the chances of lock-related problems manifesting themselves. The present method circumvents the locking problems. It does this by leveraging the fact that all update operations (asset creations, updates, moves, deletes) are recorded and the system has a cumulative provenance record of all that activity. When an asset is moved or updated or deleted, it remains in the system at the relevant source revisions, even if it is removed in some future revision. The present system uses this cumulative revision concept to "freeze" the view of the corpus for reporting purposes. The above report looks like this in pseudo code form:

```
Retrieve Current Revision Number R
Retrieve the time associated with Revision Number R and print a
header   for the report using the DDMMYY HH:MM associated with
Revision R
    Get a list of all assets in first_draft/ folder as it
    looked at Revision R
    (QUERY 1)
        For each asset found:
            Get the asset as it looked at Revision R: (QUERY 2)
            Add line to report about the asset
        Print summary line to the report
```

Updates can continue uninterrupted while any number of reporting functions are going on simultaneously. No locks are required. Every report produced is guaranteed to be self-consistent because it reflects the contents of the system at a specified point-in-time (the revision number). Note also that the report uses the time-stamp for the revision number.

A further aspect of the present method is concerned with the performance of corpus management systems. In general, there are significantly more requests to query a corpus management system than there are requests to update it. This is especially true at web scale where the number of potential users querying/viewing the repository is orders of magnitude larger than the number of potential users updating it. With the present method, queries performed with respect to a given revision number are fully idempotent. In other words, they can be cached without any need for expiry. This has significant performance advantages at Web scale. The use of revision-based URIs allows present system to leverage well developed caching machinery of HTTP to cache queries.

A further aspect of the present method is concerned with making it possible to use workflow provenance as the basis for a machine readable data format/serialization of corpus management systems.

Each revision is represented on a single line of the 7-bit clean, pure ASCII text file
Each line is a well formed JSON dictionary
Keys in the outer level dictionary are standardized:
   revno: string: revision number
   username: string: user name who made the revision
   rev_date: string: revision date and time as a string in YYYY/MM/DD HH:MM:SS format
   rev_type: string. One of:
     "create"
     "update"
     "move"
     "delete"
   path_type: string: one of:
     "file"
     "folder"
   path: string: path of the file/folder
   metadata: Dictionary containing any application-specific metadata to be stored with the revision.
   data: BASE64 encoding contents of the revision e.g. the stream of bytes for a file create or update (optional).

An example is shown below (note that multiple lines are used for illustrative purposes but in a real file, each revision is a single line of well formed JSON dictionary syntax:

```
{
"revno":"10000",
"username":"joe",
"rev_date":"2011/01/18 02:08:18",
"rev_type":"create",
"path_type":"file",
"path":"first_drafts/a.odt","metadata":{"AUTHOR:"Joe",
"DUE_DATE:"ASAP"}
}
```

The advantages of this are many. It provides a file format for content, corpus and workflow processing. Additionally, it provides a technology neutral format for archiving, dissemination and regulatory reporting. Furthermore, it provides a technology neutral format for backup/restore operations. It provides a technology neutral format for streaming workflow events between digital asset management nodes in a distributed system. By simply including the data payload field, the provenance report is sufficiently detailed that it is possible to re-create the entire corpus, as it looked revision-by-revision.

It will be appreciated that the corpus-centric approach of the present teaching, may be applied in a variety of digital content management environments. An exemplary application of the present teaching provides for hypertext links that allows users to traverse links, moving from document to inter-related document via a web browser. Thus the user is always able to view the visited documents as they were at whatever time point set by the user. It is not intended to limit the present teaching to the exemplary application as the present teaching may be applied to other applications. For example, the present teaching may be applied in the following environments which are provided by way of example only, GIS/GeoDatabase application, Time based management of inter-related spreadsheets, Time based management of inter-related word processor documents, etc.

The GIS/GeoDatabase application will now be described by way of example. It is known in the art how to create Geographic Information Systems (GIS) by expressing the inter-relations between different types of geo-spatial data as separate, inter-related files. A typical GeoDatabase involves managing the relationships between file types such as:
   A base map
   Layer files defining polygons such as school districts, electoral districts etc.
   Layer files defining points for places e.g. based on latitude, longitude
   Attribute files defining data objects to be associated with points and polygons
   Imagery files such as aerial photography, street views etc.

Many existing GIS systems use URL hyper-links to reference the inter-related files. By utilizing the time-based corpus-centric approach of the present teaching, GIS systems and User Interfaces to GIS applications may be configured to facilitate point-in-time retrieval of files. In other words users may be presented with a user interface that allows them to move to any previous time point and see what the GeoDatabase data looked like, across all its inter-related files, at that moment in time.

This is very useful for situations such as records retention, litigation and e-Discovery where it is beneficial to be able to see what the data in the GIS system looked like at the point where some event took place. For example, the road system at the point of occurrence of a traffic accident, the demographic situation at the point when a planning permission decision was made, etc. Advantageously, by utilizing the time-based approach of the present teaching, it is possible to record the point-in-time reference in transaction records such as accounting systems or work logbooks. Thus it becomes possible, to start from a logbook entry created at time T and then go back to that point-in-time in the GIS application and see what was present in the GIS application, at time T. Advantageously, by utilizing the time-based approach of the present teaching, it is possible to do geo-spatial trend analysis and regression model creation for predictive analytics, utilizing the change history contained in the detailed log of the actions performed over time on the inter-related files that make up the geodatabase.

The time based management of inter-related spreadsheets will now be described by way of example. It is known in the art how to create complex spreadsheet models of systems in areas such as accounting and financial services by splitting a single large spreadsheet model into a set of inter-related spreadsheet files. By utilizing the time-based corpus-centric approach of the present teaching, spreadsheet models created from inter-related files facilitate point-in-time retrieval. In other words, users may be presented with a user interface that allows them to move to any previous time point and see what the spreadsheet model, consisting of a complete set of inter-related files, looked like at that moment in time.

This is an improvement on the current state of the art as spreadsheets are often used in scenarios where users need to see what was in spreadsheet models at some previous moment in time. For example, a financial officer seeking to view what a spreadsheet model contained at the end of the first quarter in a previous financial year. These models are typically constructed from sets of inter-related spreadsheets. For example:

gross_revenues.xlsx
    revenue_region_a.xlsx
    revenue_region_b.xlsx
    revenue_region_c.xlsx
    revenue_region_d.xlsx In the example, there are five inter-related, inter-linked spreadsheet files. Having access to the top level file gross_revenues.xlsx as it was at the end of the first quarter of the previous financial year, is not enough to see the full model because the formulae in that spreadsheet depend on data/formulae in the four inter-related spreadsheets for the regions a to d, shown above. By utilizing the time-based corpus-centric approach of the present invention, the user can be sure of seeing the entire spreadsheet model i.e. all five inter-related spreadsheet files as they were at any chosen historic time point. Advantageously, by utilizing the time-based approach of the present invention, it is possible to do trend analysis and regression model creation for predictive analytics, utilizing the change history contained in the detailed log of the actions performed over time on the inter-related spreadsheet files that make up the spreadsheet models.

The time based management of inter-related word processing documents will now be described by way of example. It is known in the art how to create complex digital documents such as contracts, insurance policies, technical manuals by splitting single large documents into a set of inter-related documents in what are known as master/slave arrangements. Typically such documents are published as single objects and versioned as single objects. For example:

jones_contract_v1.doc
    standard_clauses.doc
    clause_a.doc
    clause_b.doc
    clause_c.doc In the example, five separate documents are edited independently but published via an assembly process in which each of the slave documents is "pulled in" to the master file. A common publishing format is PDF. The PDF of the above scenario might appear as jones_contrac_t v1.pdf, but it will contain all the content from the four slave documents as they were at the moment the master file was updated. By utilizing the time-based corpus-centric approach of the present teaching, master/slave documents can be made time-ware. In other words, a user may be presented with a user interface that allows them to move to any previous time point and see what the complete set of master/slave documents looked like at that moment in time. This is an improvement on the current state of the art as master/slave documents are often used in scenarios where users need to see what was in the complete document set at some previous moment in time. By utilizing the time-based corpus-centric approach of the present teaching, the user is able see the entire document material i.e. all five inter-related document files as they were at any chosen historic time point.

An example of a corpus snapshot URLs for third party application integration will now be described. Advantageously, the time-based approach of the present teaching, allows the user to create a "snapshot URL" which serves as a short identifier, that may be used to access and navigate the entire corpus at the time-point specified in the URL. Advantageously, these short identifiers can be added into third party applications such as e-mails, accounting systems, logbooks, transaction databases, spreadsheets etc. to effectively "snapshot" what a corpus of information looked like at any given point-in-time. For example, consider a financial trading situation where a trade is made under a regime of rules, regulations, guidelines that change on a regular basis. Utilizing the corpus snapshot URIs of the present teaching, traders can record the entire state of the rules, regulations and guidelines as they existed at the moment the trade was made. It will be appreciated that this has significant applications both for internal record keeping, management accounting, litigation support and external audits.

Another example would be a treasury function in a private sector business or in a government. Disbursements are made under a regime of rules, regulations, guidelines that change on a regular basis. Utilizing the corpus snapshot URLs of the present invention, it is easy to record the entire state of the rules, regulations and guidelines as they existed at the moment the disbursement was made. It will be appreciated that this has significant applications for public sector record keeping, transparency, litigation support, legislative oversight and external audits.

A further example would be a hospital environment in which data from a variety of applications ranging from laboratories to patient monitoring needs to be aware of a complex set of policies, rules and regulations which change over time. With the present teaching it is possible in a hospital environment to store snapshot URLs to a complete corpus of data as it stood at any moment in time. The snapshot URL can cover content directly relating to individual patients and to rules/regulations/policies as desired.

It will be appreciated that this has significant applications for risk management, litigation support, compliance and external audits.

An example of how the present teaching may be applied in a time-based repository will now be described. It is known in the art how to organize digital content into a folder structure so that users interact with content using well established digital metaphors for paper files and paper/cabinet folders. Such repositories are generally known as "file systems". It is known how to create file systems from a variety of network digital storage devices using open APIs such as AtomPub (The Atom Publishing Protocol), SAMBA and NTFS (New Technology File System). It will be appreciated that the point-in-time-based aspects of the present teaching may be used to implement a point-in-time file system. Advantageously, the end-user experience of these point-in-time file systems is indistinguishable from any other file system and will seamless integrate into all existing applications such as:

desktop managers
file managers
word processor master/slave files
spreadsheets, including inter-related sets of spreadsheets, connected via
spreadsheet links Advantageously, by exposing a read-only file-system based on any chosen point-in-time, users can be presented with a standard read-only file-system that allows them to see a set of inter-related files as they appeared at that particular point-in-time. Thus for example, a master spreadsheet and its linked child spreadsheets can be known to be consistent with each other as they will all be reflective of the time-point used to create the read-only file system. Advantageously, by exposing a read-write file system, the present teaching may be made to behave like a normal file system and yet, internally, it keeps complete point-in-time track of all the inter-related files that make up the content of the file system. Advantageously, applications that support inter-related files but are not natively time-ware such as spreadsheets, GIS editing tools (e.g. layers of data), word-processors (master/slave files), RuleBase systems, can be made time-ware without any modifications to the applications themselves. As long as the applications know how to persist their data to a standard file-system, they can be made time-aware using the present teaching.

An example of how the present teaching may be applied in a web application will now be described. It will be appreciated that the present teaching allows point-in-time access to any digital byte-stream as it looked at a particular moment in time. Advantageously, this includes byte-streams for software as well as for data.

For example, consider a web application consisting of:
html pages
pdf pages
javascript application logic The point-in-time capabilities of the present teaching may be applied to all three data types above. It follows that the rendering and the interactive behavior of the website can be managed under the same point-in-time versioning regime as all the inter-related data files. In other words, not only is it possible using the present teaching to view all the data in a system as it was at a given historical time point, it is also possible to view the data using the website application logic, as it also looked at that same historical time point. For example: 1 January: Application Launches with data files X, Y, Z and Javascript logic files A, B, C
1 February: Data file X changes to X1
1 March: Data file Y changes to Y1
1 April: Application logic file A changes to A1
1 May: Data file Z changes to Z1
1 August: Current point-in-time In this example, the data corpus changes three times between January and May while the application logic changes twice over the same time period. If the data corpus is managed under the point-in-time paradigm of the present teaching, but the application logic is not, then the user who goes back in time from 1 August to 1 March will see the data using the web application logic as it was at 1 August i.e. including the changes made on April 1. If both the data corpus and the application logic are managed under the point-in-time paradigm of the present teaching, then the user who goes back in time from 1 August to 1 March will see the data using the web application logic as it was at 1 March i.e. exactly the same application logic that was being used on 1 March. Advantageously, this allows applications to be built which not only preserve all data as it was at each previous point-in-time, but also preserves rendering and interactive behaviors of applications such as websites, as they were at each previous point-in-time. It will be appreciated that the more dynamic behavior is used in a website, the more valuable it becomes to be able to go back in time and see the data at some historic time T, as it would have looked, rendered with the application logic as it also looked at time T.

Figure 5:
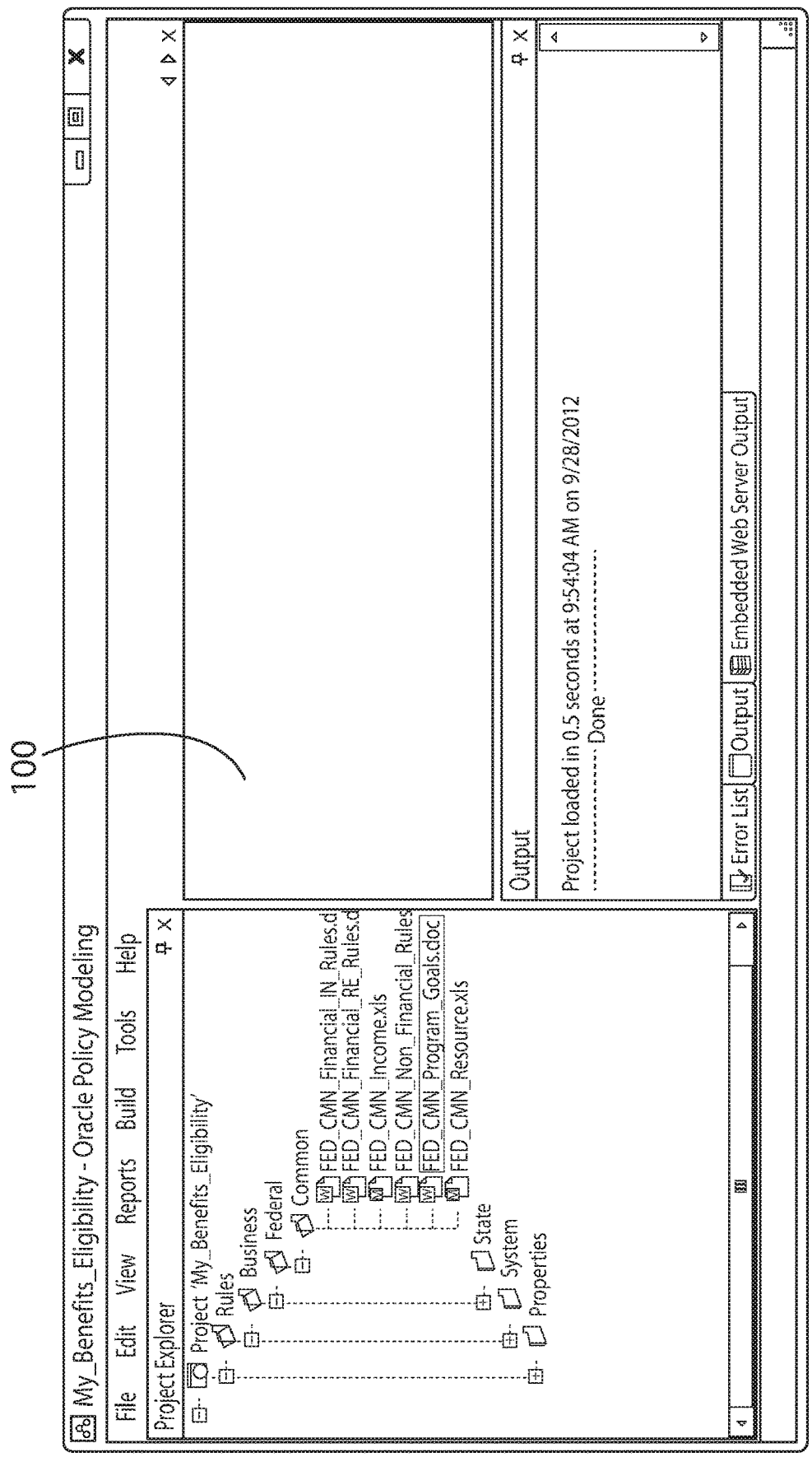
FIG. 5 is a detail of a data repository in accordance with the present teaching.
Figure 6:
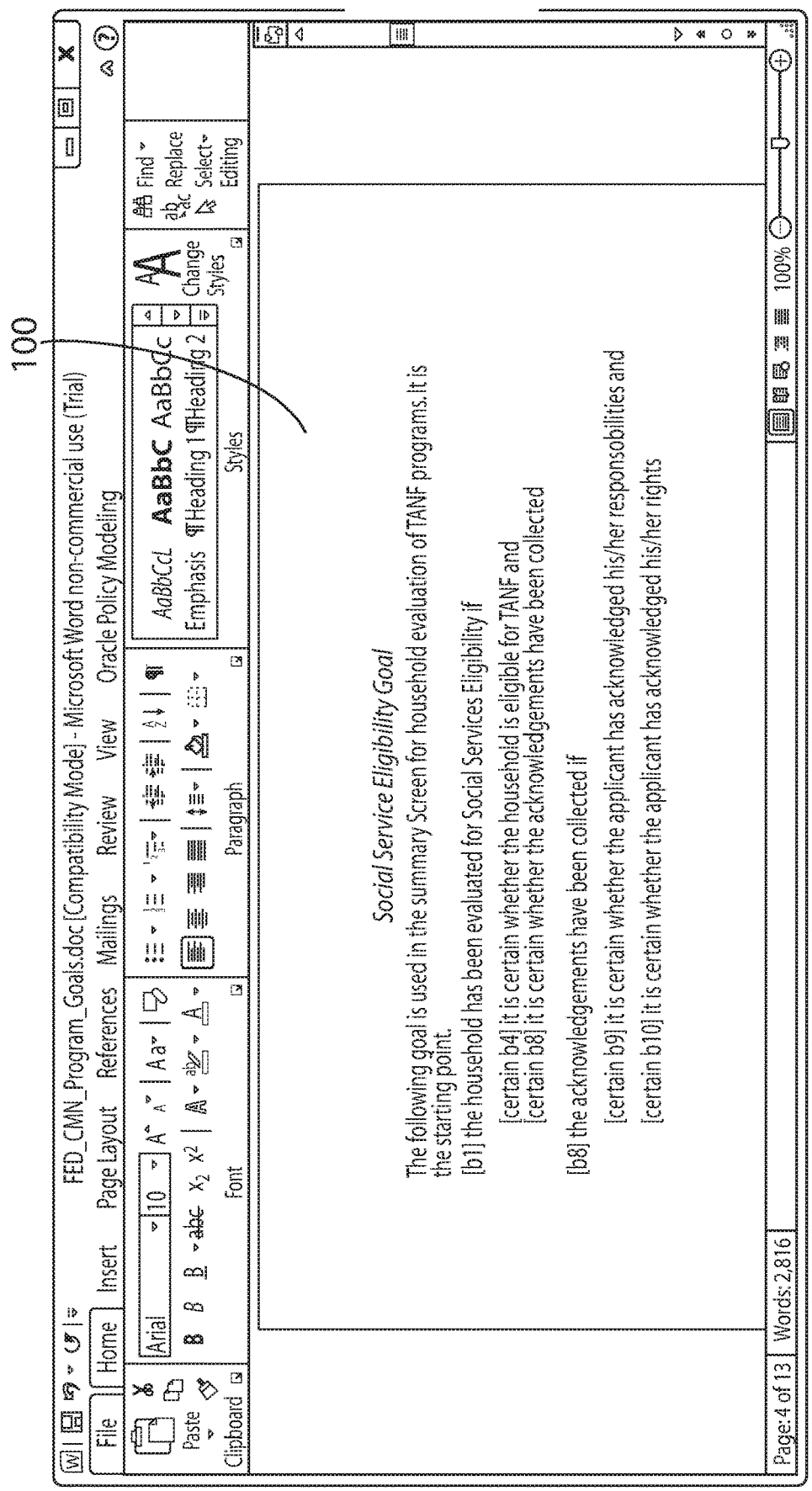
FIG. 6 is a detail of the data repository of FIG. 5.
Figure 7:
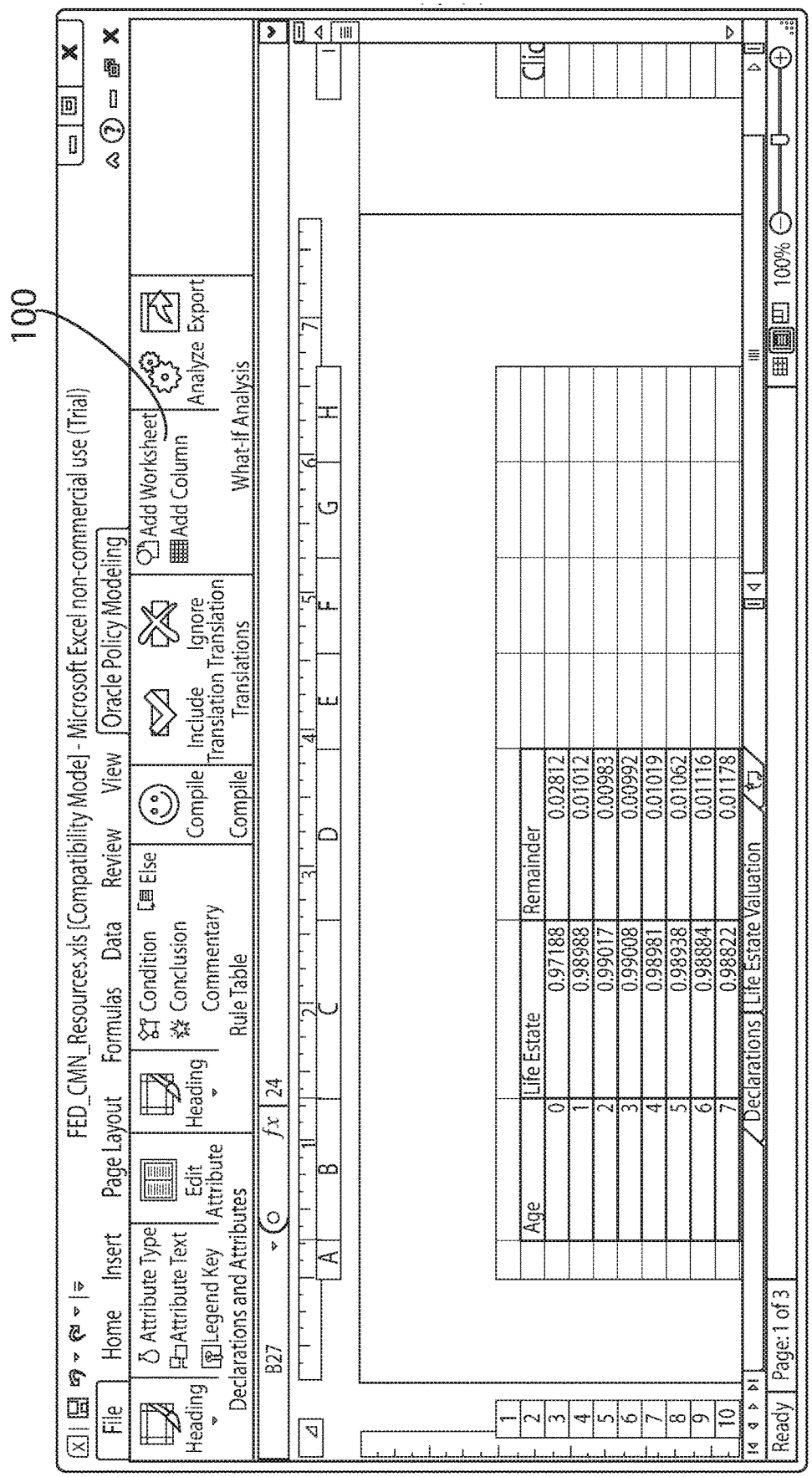
FIG. 7 is a detail of the data repository of FIG. 5.
Figure 8:
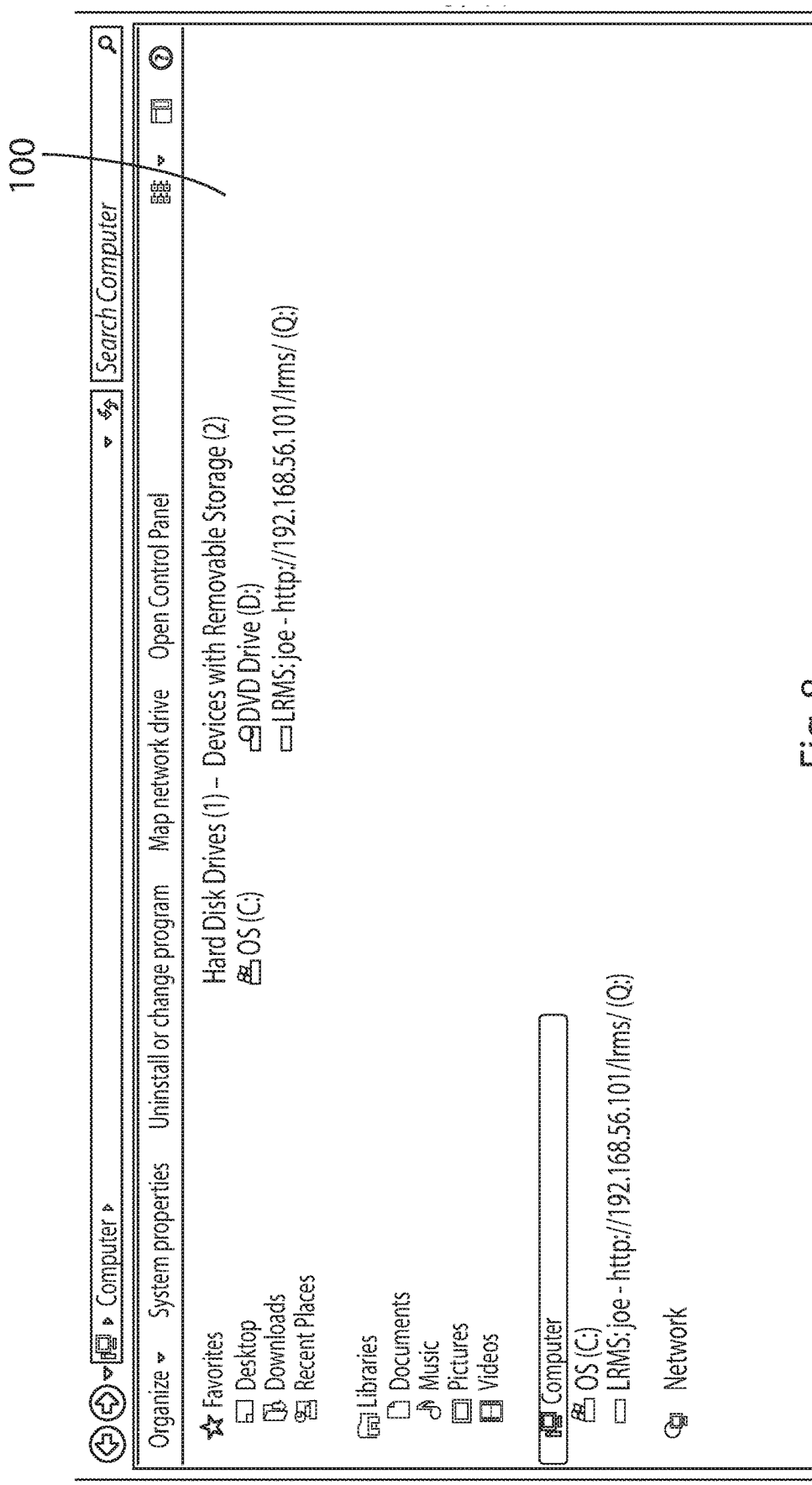
FIG. 8 is a detail of the data repository of FIG. 5.
Figure 9:
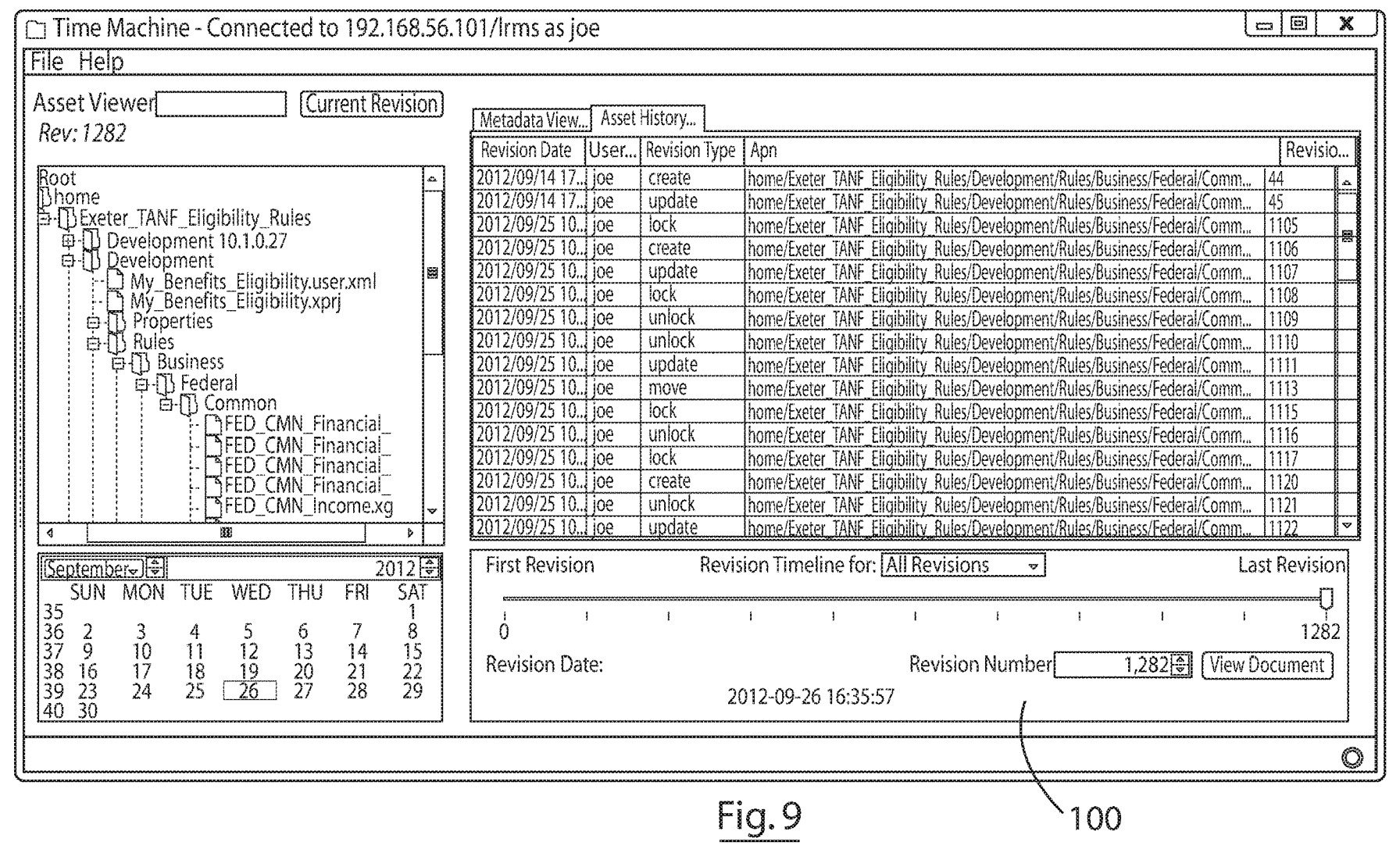
Figure 10:
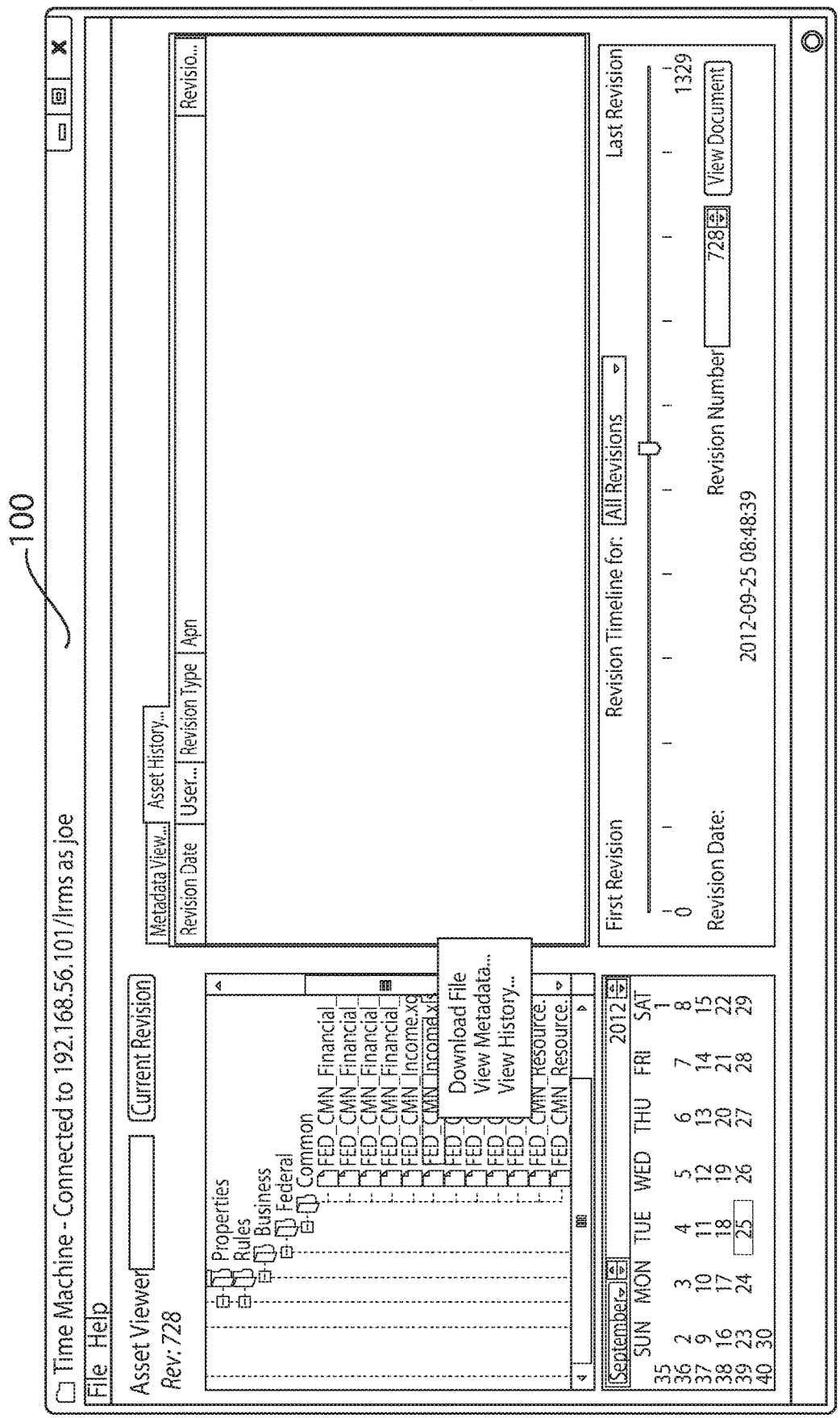
FIG. 10 is a detail of the data repository of FIG. 5.
Figure 11:
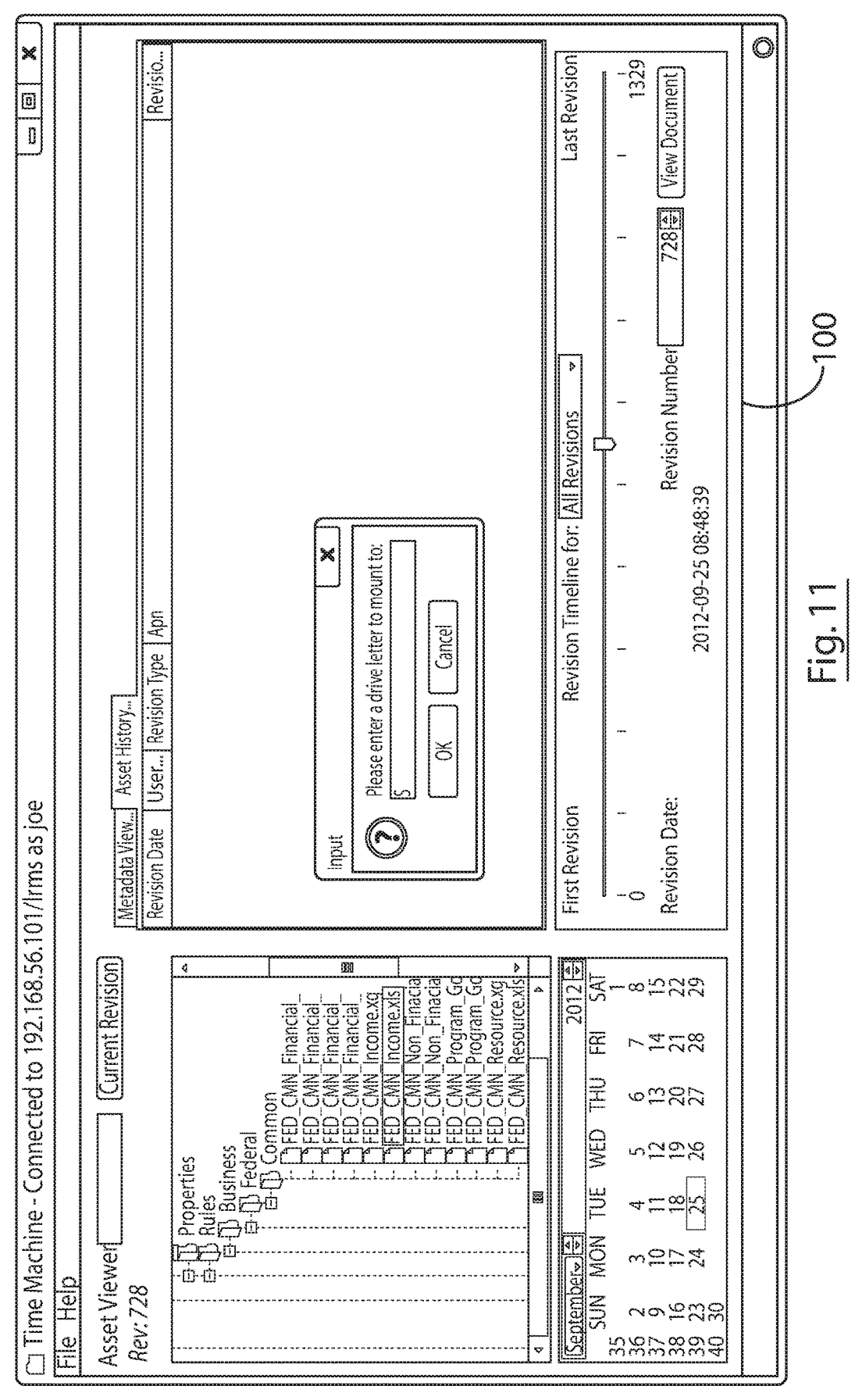
Figure 12:
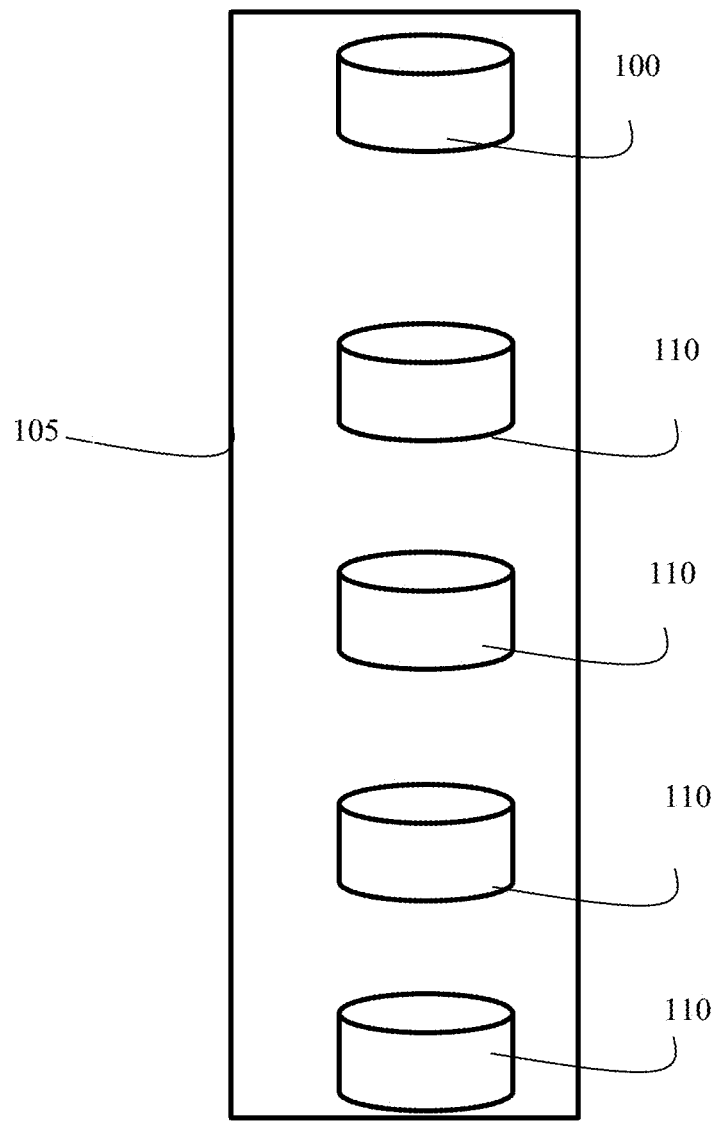
FIG. 12 is a block diagram of an exemplary system on which the data repository of FIG. 5 resides.

An exemplary application of the data repository 100 in operation will now be described with reference to FIGS. 5 to 12. The data repository 100 is stored on a server 105 as illustrated in FIG. 12. The server 105 uses a Microsoft Windows file-system which is well known to those skilled in the art. All Windows applications that can read/write files and navigate folder structures may be used with the data repository 100 of the present invention. The benefit of this is that any existing Windows application becomes "time-aware" without any change being necessary to the application itself. Note that although Windows is used here as an example, the same is true for any other operating system or Cloud platform e.g. Linux, NTFS, DropBox, WebDav etc. FIG. 5 illustrates a graphical user interface of the digital archive 100 which includes Microsoft Word and Microsoft Excel files that can be edited in the normal way. FIG. 6 illustrates an exemplary Microsoft Word file; and FIG. 7 illustrates an exemplary Microsoft Excel file which are incorporated into the data repository 100. The data repository 100 may be hosted on a network drive as illustrated in FIG. 8. By using the time-aware features of the present teaching it is possible to move to any previous point-in-time and view what the entire record of word/excel files looked like at that moment in time as illustrated in FIG. 9. It will be appreciated that each time that an action is implemented on any of the word or excel files, the data repository 100 containing these files is versioned thereby creating versioned data repository 110 as illustrated in FIG. 12. Each versioned data repository 110 is assigned an associated version identifier which is time stamped for facilitating future retrieval thereof. Discrete files may be downloaded from the server 105, as they looked at any given point-in-time as illustrated in FIG. 10. A read-only file-system can also be created that shows what all the files in the server 105 looked like at a point-in-time. For example, in FIG. 11 a new read-only network drive S is created showing the complete archive as it was 25 Sep. of 2012 at 8:48 a.m. The complete archive includes the original data repository 100 and all the versioned repositories 110.

Figure 13:
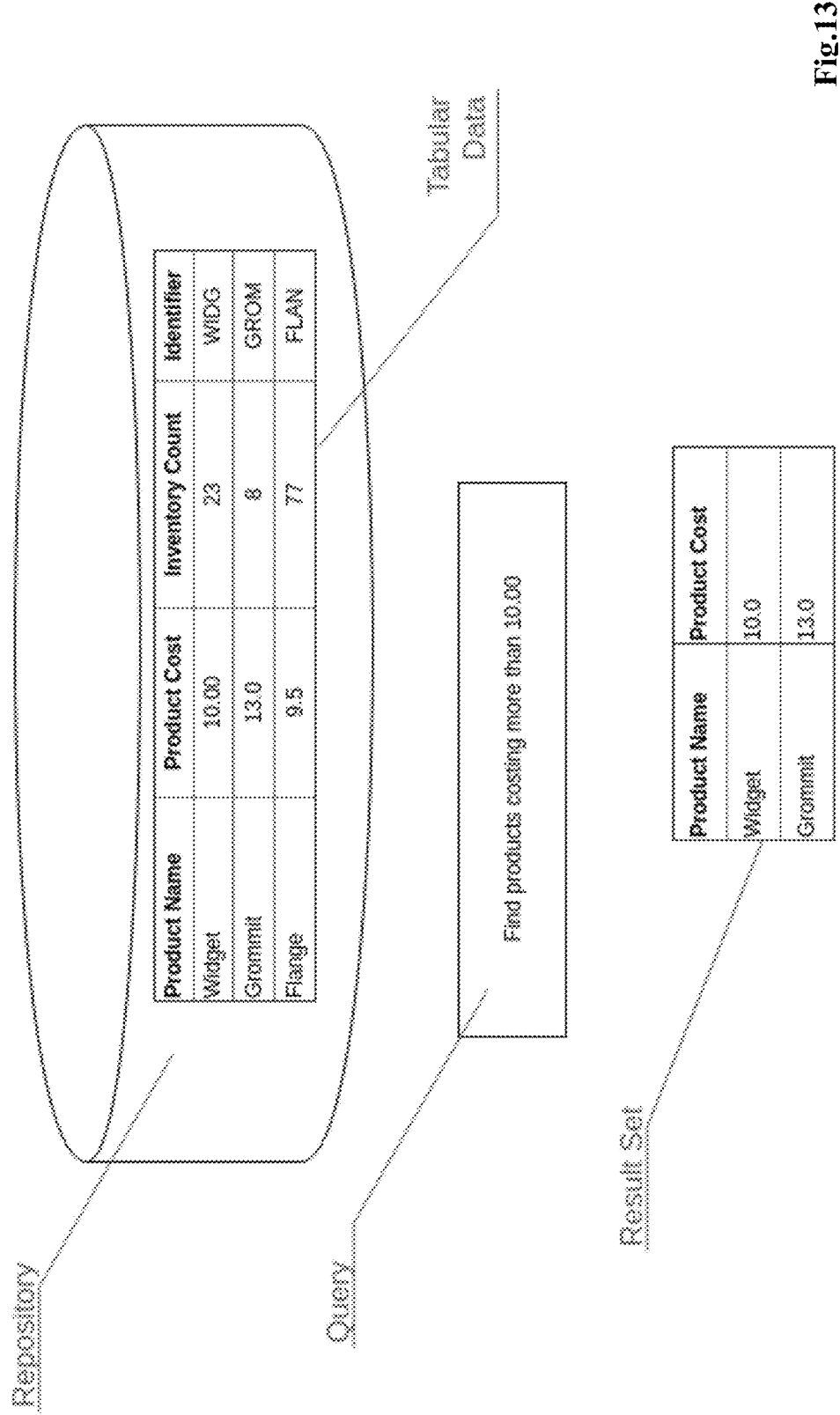
FIG. 13 illustrates a query on a tabular repository illustrating how a result set may contain a copy of the queried artifacts, resulting in the result set being independent of any updates performed after the query.
Figure 14:
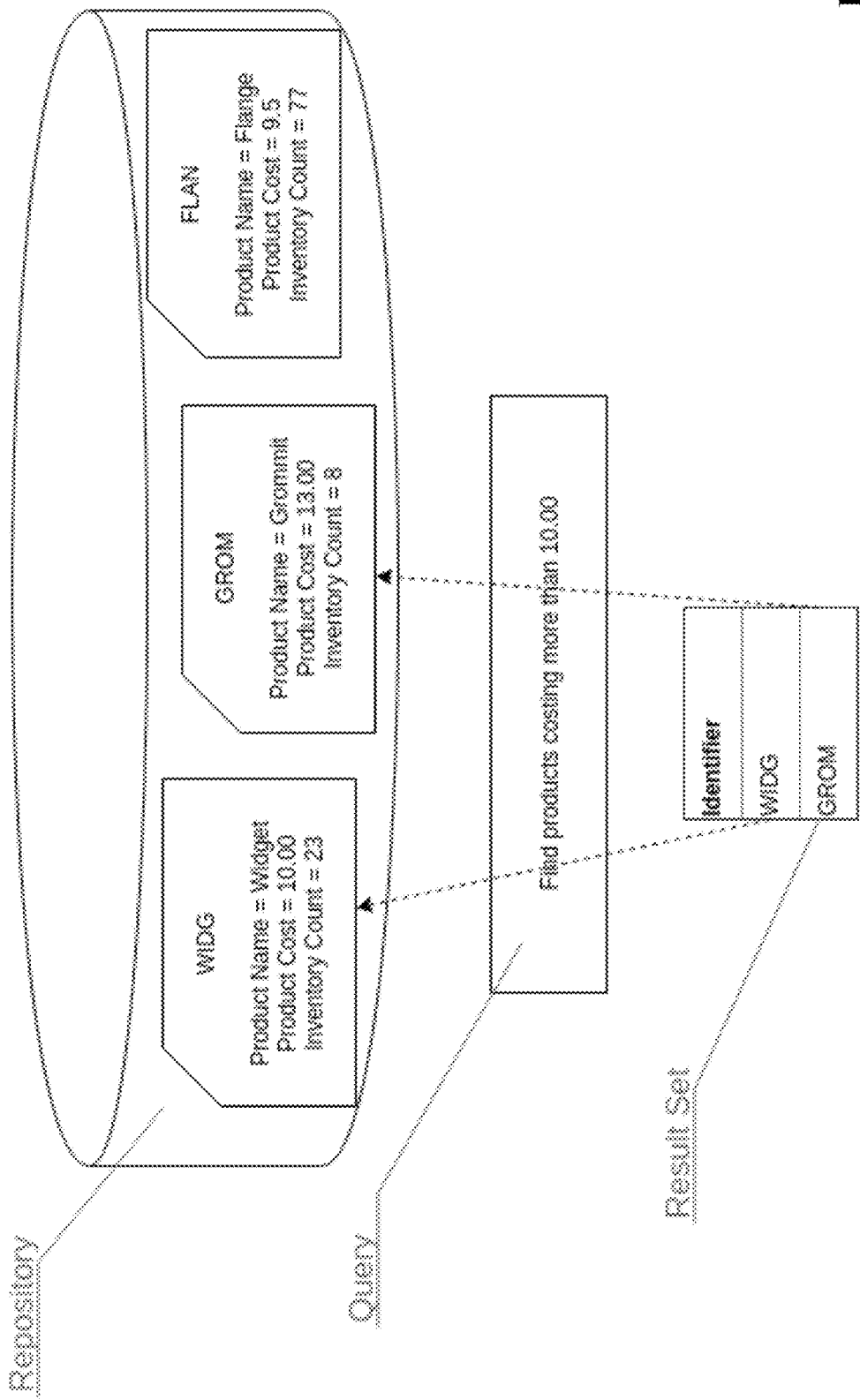
FIG. 14 illustrates a query on a hypermedia repository with the same information as illustrated in FIG. 13, illustrating how the result set contains pointers to the queried artifacts as opposed to copies of the information.

Using the system and methodology as described above it is possible to use the facility to examine two or more documents existing at different points-in-time to address a common consistency problem with querying repositories of information that are constantly changing. In this way it is possible to provide for hypermedia query consistency without the need for locking, mutual exclusion zones or content replication. FIGS. 13 to 14 provide further detail on how such an implementation may be effected whereby purely tabular data may be processed in a fashion that mimics the complexity of results from hypermedia data in terms of query consistency. FIG. 13 illustrates a query on a tabular repository illustrating how the result set contains a copy of the queried artifacts, resulting in the result set being independent of any updates performed after the query. For example, the widget price information could be changed in the repository without impacting the consistency of the result set.

FIG. 14 illustrates a query on a hypermedia repository with the same information, illustrating how the result set contains pointers to the queried artifacts as opposed to copies of the information. The dotted lines indicate the pointers. The accuracy of the result set is dependent on any updates performed after the query. For example, if the WIDG object in FIG. 14 is deleted, the result set in FIG. 14 is now partially invalidated, because the only way to find the queried attributes of the WIDG object, is to dereference the pointer, but the object no longer exists in the repository. In this way, it is possible within the context of the present teaching to provide an architecture whereby tabular data is hosted in document-centric containers as metadata fields, in order to ensure that there is no risk of inconsistencies arising between non-tabular data and tabular data. See FIG. 14 which illustrates how the three information objects WIDG, GROM and FLAN are managed as three distinct assets in the repository, as opposed to rows in a table In accordance with the present teaching such a data consistency problem is resolved. Using the set of data that was previously described with reference to Table 5 it is evident each revision through time in Table 5 results in a new revision number allocation. Information is never deleted in these revisions. The old data is always available for retrieval by specifying the point-in-time i.e. revision number to be used. As can be seen in Table 5, a delete of the /committees/tax_review.odt artifact occurred at time Td, resulting in new corpus revision number Rq. A query performed on the repository after time Td. with respect to revision number Rq would return that the /committees/tax_review.odt artifact does not exist. However, a query performed on the repository with respect to revision number Rp, at any time after Tc, would return the artifact as it stood at Rp.

Using an algorithm such as that described above but replicated again below for ease of reference it is evident that a methodology per the present teaching may be used to achieve hypermedia query consistency without the need for locks, semaphores or replicas:

```
Retrieve Current Revision Number R
Retrieve the time associated with Revision Number R and print
a header   for the report using the DDMMYY HH:MM associated
with Revision R
    Get a list of all assets in first_draft/ folder as it
    looked at Revision      R
    (QUERY 1)
        For each asset found:
            Get the asset as it looked at Revision R: (QUERY 2)
            Add line to report about the asset
            Print summary line to the report
```

For the example shown in FIG. 14, the method works as follows:

| Time | Action | Notes |
|---|---|---|
| T1 | Query Repository for Repository Revision Number. Answer is R1. Store in variable T1Rev | At this point, the three objects in FIG. 14 are all extant in the latest version of the dynamic repository: R1. |
| T2 | Delete the WIDG object | Results in a new revision number for the repository R2. |
| T3 | Execute the query "find products costing more than 10.00", specifying T1Rev as the point-in-time to use. | Repository reverts its view to be the repository as it was at R1. The pointers returned include the R1 time point reference. |
| T4 | Use the pointers in the result set to access the WIDG object | Although the WIDG object no longer exists at time T4, it did exist at T1 which is the time point specified in the reference to WIDG in the result set - R1. |

Using such a methodology the individual data files can be hypermedia objects such that the method of the present invention can be used to achieve hypermedia query result set consistency regardless of the hypermedia involved e.g. videos, images, tabular data, documents, web pages.

In this way it is possible to parse a data set defining an individual point-in-time representation of a corpus of data files representing a hypermedia repository to generate a result set and each result set can be automatically cached indefinitely because the repository revision identifier makes the result set always valid regardless of any future changes to the hypermedia repository. It will be further understood that each result set can itself, include queries, allowing for hierarchical and recursive query patterns that yield composite result sets that are always valid regardless of any future changes to the hypermedia repository. In this way, any singularly retrieved artifacts can themselves contain repository pointers to other artifacts. By using these pointers in conjunction with a repository version identifier R, the referenced artifacts can be retrieved at they were at a historic time point. Thus allowing hypermedia graph traversal at a point-in-time, without requiring the creation of a self-contained result set. In an implementation of such an arrangement it is possible to configure the data repository system as a network drive so that the hypermedia query consistency method can be used to address what is known in the art as Time Of Check of Time Of Use, TOCTOU, bugs.

The present system provides detailed provenance reports which may act as technology independent yet machine readable backups. These can be restored into nodes that may be based on completely different technology substrates. This allows compliant systems to change as technology changes yet carry forward the provenance as well as the content of digital assets from one technology generation to the next.

It will be understood that what has been described herein is an exemplary data repository having interrelated digital data files. While the present application has been described with reference to exemplary arrangements it will be understood that it is not intended to limit the teaching of the present disclosure to such arrangements as modifications can be made without departing from the spirit and scope of the application. It will be appreciated that for simplicity and clarity of illustration, where considered appropriate, reference numerals may be repeated among the figures to indicate corresponding or analogous elements. It will be understood that while exemplary features of a system and methodology in accordance with the teaching of the invention have been described that such an arrangement is not to be construed as limiting the invention to such features.

A method of and a system for generating a data repository in accordance with the present teaching can be implemented in software, firmware, hardware, or a combination thereof. In one mode, a method of and a system for generating a data repository is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. Servers or client devices or any computing means may be provided for generating the digital data record. The server or client device may include one or more processors and may include a distributed architecture with multiple nodes. It will be appreciated that the claimed method may be implemented on a cloud computing platform having a distributed network of nodes. The nodes may include one or more processing units as will be appreciated by those of ordinary skill in the art.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) residing on the server 105 may be programmed to perform the functions of the workflow of FIG. 4 for example. The processor(s) is a hardware device for executing software, particularly software stored in memory. Processor(s) can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor, Inc. Client device 100 may also represent a distributed processing architecture such as, but not limited to, SQL, Smalltalk, APL, Erlang, Scala, Hadoop, BigTable, Amazon EC2, Microsoft Azure, NoSQL databases and Cloud Computing. It will be appreciated that the system may implemented on a distributed processing architecture.

Memory is associated with processor(s) and is operable to receive data. Memory can include any one or a combination of volatile memory elements (e.g., random access memory (RAM, such as DRAM, SRAM, SDRAM, etc.) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions of the workflow. In the example heretofore described, the software in memory includes one or more components of the method of and a system of the present teaching and is executable on a suitable operating system (O/S). A non-exhaustive list of examples of suitable commercially available operating systems is as follows: (a) a Windows operating system available from Microsoft Corporation; (b) an Apple iOS available from Apple Computer, Inc; (c) a Macintosh operating system available from Apple Computer, Inc.; (d) a UNIX operating system, which is available for purchase from many vendors, such as the Hewlett-Packard Company, Oracle Inc.; (e) a LINUX operating system, which is freeware that is readily available on the Internet; (f) a run time Vxworks operating system from WindRiver Systems, Inc.; or (g) an appliance-based operating system, such as that implemented in handheld computers, tablets or personal digital assistants (PDAs) (e.g. Apple iOS, Android, Roku). The operating system essentially controls the execution of other computer programs, such as that provided by the present teaching, and provides scheduling, input-output control, file and data management, memory management, and communication control and related services.

The system provided in accordance with the present teaching may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices and components of the client device may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices may also include output devices, for example but not limited to, output modules for PLCs, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, and a router.

When the method of and system of the present teaching is implemented in software, it should be noted that such software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), Digital Video Disc (DVD), Universal Serial Bus (USB) and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Any process descriptions in the accompanying Figures, should be understood as representing modules, segments, or portions of code which include one or more executable instructions for implementing specific logical functions or steps in the process/workflow, and alternate implementations are included within the scope of the embodiments of the present teaching in which functions may be executed out of order from that shown or discussed, including substantially concurrently or in reverse order, depending on the functionality involved, as would be understood by those having ordinary skill in the art.

It should be emphasized that the above-described embodiments of the present teaching, particularly, any "preferred" embodiments, are possible examples of implementations, merely set forth for a clear understanding of the principles. Many variations and modifications may be made to the above-described embodiment(s) without substantially departing from the spirit and principles of the invention. All such modifications are intended to be included herein within the scope of this disclosure and the present invention and protected by the following claims.

Although certain example methods, apparatus, systems and articles of manufacture have been described herein, the scope of coverage of this application is not limited thereto. On the contrary, this application covers all methods, systems, apparatus and articles of manufacture fairly falling within the scope of the appended claims.

The words comprises/comprising when used in this specification are to specify the presence of stated features, integers, steps or components but does not preclude the presence or addition of one or more other features, integers, steps, components or groups thereof.

I claim:

1. A data repository configured for storing original content and modified content, the original and modified content being addressable for facilitating fully-consistent point-in-time retrieval thereof without the use of locks or replicas; the data repository comprising:
   a first corpus defined by two or more digital files which are associated with the original content, the two or more digital files being inter-related to one another at a first point-in-time, the first corpus including hypertext links that allow users to traverse links, moving from one digital file at the first point-in-time to another inter-related digital file at the same first point-in-time via a web browser, the first corpus defining a snapshot of the two or more digital files as they existed at the first point-in-time;
   a log detailing actions implemented on the two or more of the digital files;
   a second corpus defined by two or more digital files which are associated with the original content, the two or more digital files being inter-related to one another at a second point-in-time, the second corpus being defined by a versioned repository generated after an action is implemented on the one of the two or more digital files of the first corpus, wherein the versioned repository includes an updated version of the entire first corpus at the second point-in-time, the updated version including one or more modified digital files which are associated with the modified content and hypertext links that allows users to traverse links, moving from one digital file at the second point-in-time to another inter-related digital file at the second point-in-time via a web browser, the second corpus defining a snapshot of the two or more digital files as they existed at the second point-in-time; and
   a point-in-time version identifier defining a revision number associated with each corpus such that the first corpus is defined by a first revision number and the second corpus defined by a second different revision number, each revision number providing a point-in-time identifier and retrieval point of the totality of digital files defined by each of the first corpus and the second corpus respectively, and
   wherein the data repository is configured:
      to use the revision number for each of the first and second corpus in combination with the hypertext links within each of the first corpus and the second corpus to constrain a user traversal of the hyperlinks defined within each of the first corpus and the second corpus to those documents that are defined wholly within the first corpus and the second corpus respectively; and
      to use the revision numbers in generating point-in-time hyperlinks such that retrieved query result sets can be traversed at any particularly retrieved point-in-time using the generated point-in-time hyperlinks which are specific to that retrieved query result set.

2. A repository as claimed in claim 1, wherein the log includes time data.

3. A data repository as claimed in claim 1, wherein the log includes a timeline.

4. A data repository as claimed in claim 1, wherein the log includes biographic data of an editor.

5. A data repository as claimed 4, wherein the log includes biographic data of a plurality of editors.

6. A data repository as claimed in claim 5, wherein the biographic data includes at least one of a name, title, professional qualification, role and address.

7. A data repository as claimed in claim 1, wherein the log is tabulated.

8. A data repository as claimed in claim 1, wherein the repository is part of a geographic information software application.

9. A data repository as claimed in claim 8, wherein the two or more digital files include a base map and a plurality of associate digital files.

10. A data repository as claimed in claim 1, wherein the repository is part of an accounting software application.

11. A data repository as claimed in claim 10, wherein the two or more digital files include a plurality of inter-related spreadsheets.

12. A data repository as claimed in claim 1, wherein the repository is part of a word processing software application.

13. A data repository as claimed in claim 12, wherein the two or more digital files comprises a plurality of inter-related word processor documents.

14. A data repository as claimed in claim 1, wherein the versioned repository has an associated time stamp.

15. A data repository as claimed in claim 1, wherein the repository forms part of a web application.

16. A data repository as claimed in claim 1; wherein the repository is in a format suitable for publishing on the internet.

17. A data repository as claimed in claim 1, wherein the versioned repository has an associated hyperlink address for facilitating retrieval thereof via the internet.

18. A data repository as claimed in claim 1, further comprising metadata.

19. A data repository as claimed in claim 1, wherein the actions includes at least one of updating, deleting, editing, and creating.

20. A data repository as claimed in claim 1, configured for facilitating trend analysis and regression model creation utilizing a change history contained in the log.

21. A data repository as claimed in claim 1, in which the one or more digital files comprise associated application logic and where the application logic is also stored so that the versioned repository is viewed for the time set by the user, it will appear as it would have looked, rendered with the application logic as it also looked at that time.

22. An article of manufacture, comprising: a non-transitory computer readable storage medium having machine readable instructions embodied thereon which, when executed by a processor, cause the processor to provide a data repository comprising:
- a first corpus defined by two or more digital files with associated content, the two or more digital files being inter-related to one another at a first point-in-time, the first corpus including hypertext links that allow users to traverse links, moving from one digital file at the first point-in-time to another inter-related digital file at the same first point-in-time via a web browser, the first corpus defining a snapshot of the two or more digital files as they existed at the first point-in-time;
- a log detailing actions implemented on at least one of the two or more of the digital files;
- a second corpus defined by two or more digital files which are associated with the original content, the two or more digital files being inter-related to one another at a second point-in-time, the second corpus being a versioned repository being generated after an action is implemented on the at least one of the two or more digital files of the first corpus; the versioned repository comprising an updated version of the entire first corpus at the second point-in-time, the updated version including one or more modified digital files which are associated with modified content and hypertext links that allows users to traverse links, moving from one digital file at the second point-in-time to another inter-related digital file at the second point-in-time via a web browser, the second corpus defining a snapshot of the two or more digital files as they existed at the second point-in-time; and
- a version identifier being associated with the versioned repository for facilitating point-in-time retrieval thereof, wherein the versioned repository comprises revision numbers allocated to each corpus as opposed to revision numbers allocated to individual files of each of the corpus so as to allow a user view the totality of individual digital files within each corpus as they were at whatever time point is set by the user; and further
wherein the machine readable instructions are configured to cause the processor to:
  - use the revision number for each of the first and second corpus in combination with the hypertext links within each of the first corpus and the second corpus to constrain a user traversal of the hyperlinks defined within each of the first corpus and the second corpus to those documents that are defined wholly within the first corpus and the second corpus respectively, and
  - to use the revision numbers in generating point-in-time hyperlinks such that retrieved query result sets can be traversed at any particularly retrieved point-in-time using the generated point-in-time hyperlinks which are specific to that retrieved query result set.

23. A method of creating a data repository the method comprising:
- providing a first corpus defied by two or more digital files with associated content, the two or more digital files being inter-related to one another at a first point-in-time, the first corpus including hypertext links that allow users to traverse links, moving from one digital file at the first point-in-time to another inter-related digital file at the same first point-in-time via a web browser, the first corpus defining a snapshot of the two or more digital files as they existed at the first point-in-time;
- providing a log detailing actions implemented on at least one of the two or more of the digital files;
- providing a second corpus defined by two or more digital files which are associated with the original content, the two or more digital files being inter-related to one another at a second point-in-time, the second corpus being defined by generating a versioned repository when an action is implemented on at least one of the two or more digital files of the first corpus; the versioned repository comprising an updated version of the entire first corpus at the second point-in-time, the updated version including one or more modified digital files which are associated with modified content and hypertext links that allows users to traverse links, moving from one digital file at the second point-in-time to another inter-related digital file at the second point-in-time via a web browser, the second corpus defining a snapshot of the two or more digital files as they existed at the second point-in-time;
- providing a point-in-time version identifier being associated with the versioned repository for facilitating point-in-time retrieval thereof wherein the versioned repository comprises revision numbers allocated to each corpus as opposed to revision numbers allocated to individual files of each of the corpus so as to allow a user view the totality of the individual digital files within each corpus as they were at whatever time point is set by the user;
- storing the versioned repository;
- using the revision number for each of the first and second corpus in combination with the hypertext links within each of the first corpus and the second corpus to constrain a user traversal of the hyperlinks defined within each of the first corpus and the second corpus to those documents that are defined wholly within the first corpus and the second corpus respectively; and
- using the revision numbers in generating point-in-time hyperlinks such that retrieved query result sets can be traversed at any particularly retrieved point-in-time using the generated point-in-time hyperlinks which are specific to that retrieved query result set.

24. A method as claimed in claim 23, wherein the first and second corpus comprise hypermedia objects.

25. The method of claim 24, comprising parsing one of the first and second corpus to generate a result set, the method further comprising caching the result set, the result set being associated with a corpus revision identifier to facilitate subsequent retrieval and interrogation of the result set.

26. The method of claim 25, further comprising querying the result set to generate hierarchical and recursive query patterns that yield composite result sets.

27. The method of claim 26, comprising outputting from a result set at least one singular retrieved artifacts that comprises a corpus pointer to other artifacts within the corpus.

28. The method of claim 27, comprising using a plurality of corpus pointers in conjunction with a corpus revision identifier to allow hypermedia graph traversal at a point-in-time, without requiring the creation of a result set.

29. The method of claim 24, wherein tabular data is hosted in document-centric containers as metadata fields to facilitate contemporaneous storage of non-tabular data and tabular data.

* * * * *